June 30, 1970 M. D. MINTZ 3,517,820
COALESCER CARTRIDGE
Filed March 15, 1968
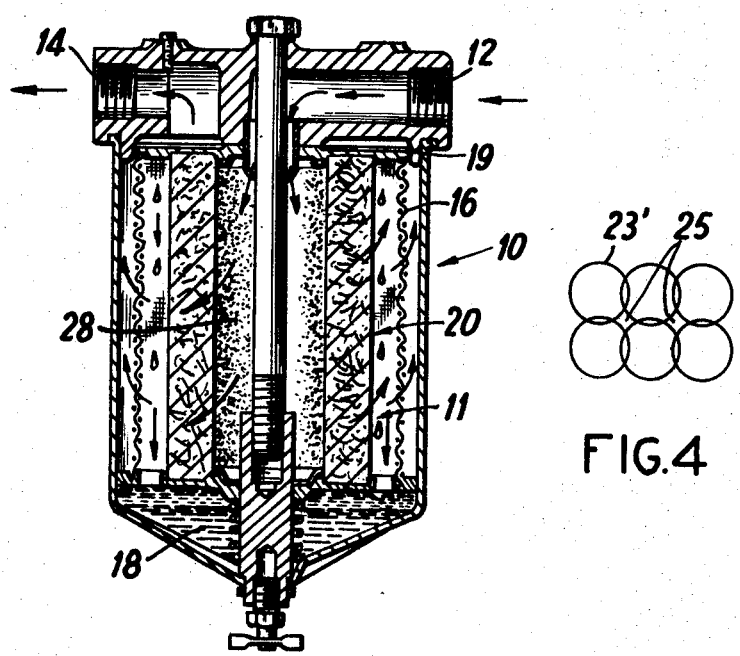
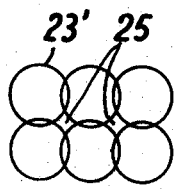
FIG. 4
FIG. 1
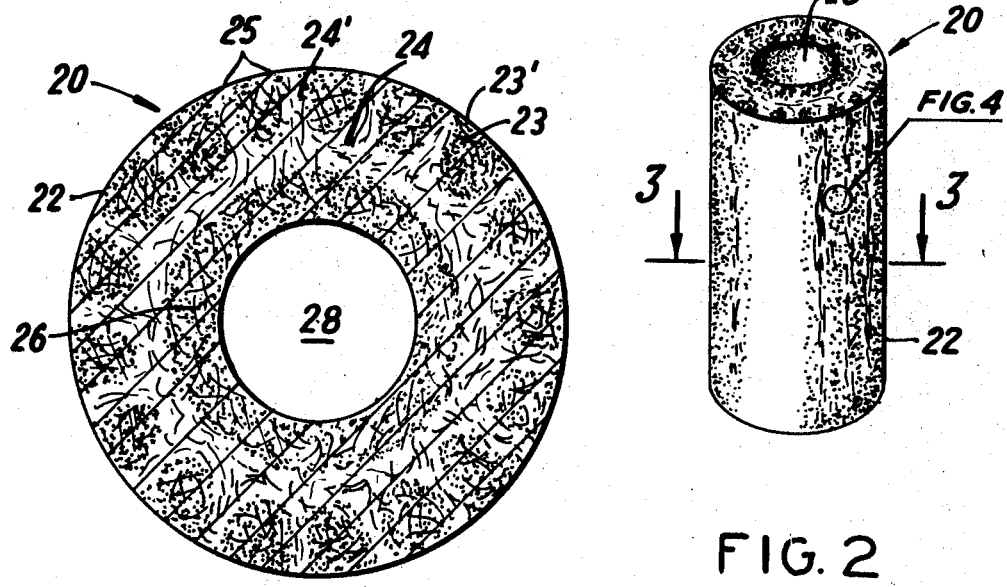
FIG. 3
FIG. 2
INVENTOR.
MICHAEL D. MINTZ
BY
ATTORNEYS

# United States Patent Office 3,517,820
Patented June 30, 1970

3,517,820
COALESCER CARTRIDGE
Michael D. Mintz, Edison, N.J., assignor to Purolator Products, Inc., Rahway, N.J., a corporation of Delaware
Filed Mar. 15, 1968, Ser. No. 713,486
Int. Cl. B01d 39/06
U.S. Cl. 210—491      8 Claims

ABSTRACT OF THE DISCLOSURE

The invention relates to a coalescer adapted to remove the minor phase liquid from an emulsion of minor phase-major phase liquid. The discharge section of the coalescer is immediately downstream of the primary coalescing section and is structured to emit droplets of minor phase liquid of predictable uniform size. Basically, the structure of the discharge section is formed of a maze of material wettable by the major phase liquid but not the minor phase liquid, having interlaced therebetween, a multiplicity of passages of material which are wettable by the minor phase liquid but not the major phase liquid. Specifically, each of the passages of material wettable by the minor phase liquid extend from the primary coalescing section and diminish in diameter as they approach the downstream wall of the coalescer where they terminate in their smallest diameter.

Field of the invention

This invention relates to a coalescer for removing a minor phase liquid from an emulsified mixture of minor and major phase liquid. It has particular application in removing water from a water-hydrocarbon emulsion such as those which form in jet fuel, gasoline, kerosene and similar fuels or fuel oils.

Description of the prior art

The basic idea of removing a minor phase liquid such as water from an emulsion of minor and major phase liquids such as jet fuel by means of a coalescer is presently known. The presently known systems generally consist of a coalescing tank having a coalescer cartridge of hydrophilic and hydrophobic materials arranged therein through which the emulsion is passed to separate the minor phase liquid from the major phase liquid.

Typically, the coalescer tank is located in a line through which a hydrocarbon fuel, such as a jet fuel, is being pumped at a high velocity. The separation occurs when the minor phase liquid (water) in the emulsion is retarded in its passage through the cartridge and, as a consequence, concentrates on the material to form in droplets while the major phase liquid (hydrocarbon fuel) which is essentially unaffected by the cartridge material passes through the coalescing chamber. Characteristically, the minor phase liquid (water) will have a higher specific gravity than the major phase liquid and, as a consequence, will tend to settle in the bottom of the coalescer tank. However, due to the high velocity of major-phase fluid (hydrocarbon fuel) as it passes through the system, some of the droplets of the minor phase fluid (water) will generally be carried along with the major phase fluid (hydrocarbon fuel). Therefore, it has been found necessary to locate a screen or linen tube in the system to provide a means to impede the flow of the minor phase liquid droplets and facilitate the settling process.

In each of the prior art systems, the minor phase fluid is coalesced in drops of random size and, therefore, the separating of the minor phase fluid from the major phase fluid and the settling of the minor phase fluid to the bottom of the coalescer tank is less predictable and less efficient than it would be if a predictable uniform size minor phase fluid droplet were to discharge from the coalescer cartridge.

Summary of the invention

Accordingly, it is an object of the present invention to design a coalescer which will separate a minor phase fluid from a major phase fluid wherein the coalescing step accumulates minor phase droplets of a substantially uniform predictable size.

Another object of the invention is to provide a system which will effectively coalesce minor phase liquid of virtually uniform size without unduly impeding the flow of major phase fluid.

A further object of the invention is to provide a coalescer cartridge for a coalescer tank, which cartridge is designed to coalesce the minor phase liquid of a minor phase-major phase emulsion into droplets of predictable uniform size.

These objects are achieved by designing a replaceable coalescer cartridge for a coalescer tank which is adapted to be located in a fuel line of high velocity flow. The coalescer cartridge is a cylindrically shaped object having an axial core opening through which the major phase-minor phase liquid emulsion is introduced. The inner stage of the coalescing cartridge is formed of tightly or closely matted material which effectively acts as a filter to separate contaminants from the fluid, but which, in addition, provides the means to effect a small amount of initial coalescing. Concentrically arranged around the filter section is a section of fibers which are chosen for their property of being wettable by the minor phase liquid. The majority of the coalescing occurs in this section. Finally, the outer circumferential section of the cartridge is comprised of both minor-phase-wettable and minor-phase-nonwettable materials or fiber media arranged in an interlaced pattern. The wettable material or fiber media in this section may be identical with the material of the intermediate section and effectively forms a multiplicity of discrete passages for the minor phase liquid through the structure to its outer surface. Conversely, the minor-phase-nonwettable portions of the structure are formed of material which resists being wetted by the minor phase liquid but which, by its affinity for the major phase liquid facilitates its flow therethrough. As a consequence of this design, the minor phase liquid will be coalesced in the intermediate circumferential section due to its wetting of minor-phase-wettable fibers. In the outer circumferential section while the major phase fluid continues to pass essentially unimpededly through the coalescer, the minor phase liquid will seek the paths provided by the minor-phase-wettable fiber media and thereby avoid passing through the major-phase-wettable fiber media. Therefore, the minor phase liquid will be collected in the constricted area and, as a consequence, larger drops will be formed. These drops will generally be a function of the size of the constricted path and therefore uniform size droplets will form.

Brief description of the drawing

The invention will be described further by way of example, with reference to the accompanying drawings wherein:

FIG. 1 shows a sectional elevation of the coalescer unit with the coalescing cartridge of this invention mounted therein.

FIG. 2 shows a perspective view of the coalescer cartridge according to the present invention.

FIG. 3 shows a sectional view of the coalescer cartridge taken along line 3—3 of FIG. 2.

FIG. 4 is an enlarged partial view of the surface of the coalescer cartridge taken from FIG. 2.

Description of the preferred embodiment

As seen in FIG. 1, a coalescer tank 10 is shown with provisions for attachment to a fuel line. Basically, the coalescer tank 10 is comprised of an inner chamber 11, an inlet opening 12, an outlet opening 14, a coalescing cartridge 20, an outer collector sleeve 16, and a sump 18 for the accumulation of minor phase liquid.

The coalescer tank 10 is designed to be mounted in a fuel line with the inlet opening 12 arranged to receive the fuel-water emulsion and return the fuel free of water to the fuel line through outlet opening 14. To effect the coalescing, the fuel-water emulsion, after entering the coalescer tank 10 through inlet 12, flows directly into the core 28 of the coalescing cartridge 20 and passes through the porous walls of the coalescer cartridge 20 wherein the minor phase liquid is coalesced into droplets. The droplets of the minor phase liquid, due to their greater density than the major phase liquid, settle to the bottom of chamber 11 and ultimately accumulate in the sump 18. The major phase liquid continues on through the screen 16 circumferentially disposed around the cartridge and ultimately through openings 19 to an annular chamber which communicates with the outlet opening 14 attached to the fuel line.

The coalescing cartridge 20 of this invention, as best seen in FIGS. 2 and 3, is formed with an axially disposed core opening 28 through which the emulsified fluid enters. The inner circumferential section 26 of the coalescing cartridge 20 is designed to function as a filter for contaminant. It is therefore formed of thickly matted filtration material, and, to facilitate filtration with a minimum of contaminant build-up, the inner surface of the filtration section 26 may be slotted, perforated, or otherwise extended in such manner that surface cake build-up of contaminant material does not prematurely create excessive pressure losses through the element. It has been found to be desirable to form the filtration section 26 of resinated fiber glass which, although characteristically hydrophobic, will effect a limited degree of coalescing of the water emulsion in this zone.

The intermediate section 24 of the coalescing cartridge 20 is circumferentially disposed immediately about the filtration section 26 and is formed of hydrophilic fiber media. In this section, the maximum coalescing occurs since the minor phase liquid, which in this case is water, will wet or adhere to the hydrophilic fibers while the major phase liquid passes through the hydrophilic fiber media unimpededly. As a consequence, the minor phase liquid separates from the major phase liquid. The concentration of minor phase liquid in the pore structure of the hydrophilic fiber media of section 24 increases relative to the concentration of the major phase liquid. Therefore, the probability of bringing two or more of the minor phase droplets into contact so that they merge or coalesce is increased.

Continuing outwardly through the coalescing cartridge 20, the final circumferential section 22 is comprised of both hydrophilic and hydrophobic fiber media. As best seen in FIG. 3, the hydrophobic material appears in cross-section, as a peripherally disposed array of arcuate areas 23. Conversely, the hydrophilic portion of the outer circumferential section is formed of a multiplicity of projections 24' which are effectively extensions of the intermediately disposed hydrophilic section 24. Consequently, the projections 24' are merely continued paths for the minor phase fluid.

Due to the cross-sectional arcuate shape of the hydrophobic areas 23, the hydrophilic projections 24' interposed between the maze of hydrophobic areas 23 take the shape of converging paths which terminate on the cartridge outer surface in constricted discharge points 25.

With this design, the water droplets coalesced in the intermediate section 24 seek the hydrophilic projections 24' in the outer circumferential section 22 rather than the hydrophobic sections 23 while the major fluid passes through either the hydrophobic areas 23 or hydrophilic projections 24' with a minimal amount of resistance. Consequently, the water droplets formed in the intermediate section, regardless of their size, congregate in the hydrophilic paths afforded by the projections 24' and, as they converge on the constricted discharge points 25, form droplets of substantially uniform size.

It has been found that one effective arrangement of hydrophobic sections 23 obtains when the surface area 23' of each hydrophobic section 23 overlaps the four adjacent hydrophobic surface areas 23' as seen in FIG. 4. This arrangement results in locating a hydrophilic path 24 and its discharge point 25 for the minor phase liquid between a cluster of four hydrophobic sections 23.

In practice it has been found that fiber glass in its unresinated state is hydrophilic but when resinated becomes hydrophobic. Accordingly, a coalescer cartridge 20 of the subject invention can be made entirely of fiber glass, with the inner filtration section 26 and the outer hydrophobic areas 23 resinated while the intermediate coalescing section 24 and the hydrophilic projection 24' remain unresinated.

Manufacture of the coalescer of this invention can be accomplished by making a cylinder 20 of fiber glass, providing an axial opening 28 therethrough and preferentially resinating the inner and outer surfaces of cylinder 20. Application of resin to the outer surface of the coalescer cartridge is patterned such that an interlaced maze of hydrophilic extensions 24' is formed between the intermediate section 24 and the outer surface 25.

Alternatively, the outer section of the coalescer cartridge can be manufactured by first resinating the outer and inner sections thereof, then preferentially perforating the outer surface thereof and inserting individual sections of hydrophilic material therein.

It should be noted that the coalescing cartridge 20 has been described in terms of hydrophilic and hydrophobic, thereby implying that the minor phase fluid to be coalesced will be water. In practice, this is generally the case, however, the basic structural design advanced in the subject invention is not limited to a minor-major phase emulsion comprised of water and a hydrocarbon. It will have application in any system where a minor and major phase emulsion is found. The only limitation is that the material in the intermediate coalescing section 24 and the projections 24' have a greater affinity for the minor phase liquid than for the major phase liquid while the areas 23 which are arranged to repel or discourage the passage of the minor phase liquid therethrough are chosen for the property of repelling the minor phase liquid without repelling the major phase liquid.

Similarly, the invention is depicted and described as being located in a cylindrically shaped cartridge. It is apparent that the invention has application in a coalescer of any configuration.

What is claimed is:

1. A coalescer for a flow of an emulsion of a major phase liquid and a minor phase liquid to coalesce the minor phase liquid into droplets for removal from the major phase, the coalescer having an upstream and a downstream side and comprising a porous wall of material wettable by the minor phase liquid but not the major phase liquid and normally coalescing the minor phase liquid into droplets of random size; wherein the improvement comprises said wall including throughout the downstream portion, a maze of porous areas which are wettable by the major phase liquid but not the minor phase liquid and which taper from a minimum cross-sectional area at their upstream point to a maximum cross-section area at their most downstream point and which maze of areas define between them a maze of passages of material wettable by the minor phase liquid, substantially all of which passages have the same cross-sectional shape and area at the downstream surface of said wall and which diverge to a larger cross-sectional area upstream so that random sized droplets collected in the upstream portion of said wall are caused to coalesce and adhere to the media of the passages and to flow to and discharge from the downstream surface of said wall.

2. A coalescer as described in claim 1 wherein the porous wall is cylindrical with an axial core passage for the entrance of the emulsion to be coalesced.

3. A coalescer as described in claim 2 which further includes a cylindrical contaminant filtration section integrally formed with the coalescer on the surface of the axial core passage.

4. A coalescer as described in claim 3 wherein the coalescer is made of fiber glass with the filtration section being formed of matted resinated fiber glass, the intermediate coalescing section being formed of unresinated fiber glass, the maze of passages of material wettable by the minor phase liquid throughout the downstream portion being formed of unresinated fiber glass extensions of the coalescing section, and the maze of porous areas which are wettable by the major phase liquid but not the minor phase liquid being formed of resinated fiber glass.

5. An improved coalescer cartridge composed of porous media for coalescing a minor phase liquid from a flowing emulsified mixture of a minor phase liquid and a major phase liquid wherein the improvement comprises:
a first section, including a downstream surface, composed of a first porous medium wettable by the major phase liquid and repellent to the minor phase liquid;
a second section, adjacent to and upstream of the first section, composed of a second porous medium wettable by the minor phase liquid; and
a plurality of channel elements, composed of said second porous medium, extending in spaced relationship downstream from the second section through the first section and terminating at the downstream surface with ends of substantially uniform cross-sectional area, whereby the minor phase liquid, separated from the major phase liquid in the second section, preferentially flows in said second medium through said channel elements and is discharged from the downstream surface in the form of droplets of substantially uniform size, and the major phase liquid preferentially flows in said first medium through said first section.

6. A coalescer cartridge in accordance with claim 5 which further comprises: a third section adjacent to and upstream of the second section, including an upstream surface, and composed of said first porous medium for filtering solid contaminants from the emulsified mixture and for partially coalescing the minor phase liquid.

7. An improved coalescer cartridge formed of glass fibers in the shape of a cylinder with an axial hole therethrough for separating water from a hydrocarbon fuel flowing into one cylindrical surface of the cartridge and discharging from the other cylindrical surface of the cartridge wherein the improvement comprises:
a downstream cylindrical zone of resinated glass fibers, and
an upstream cylindrical zone of unresinated glass fibers having a plurality of spaced radial extensions, formed of said unresinated glass fibers, penetrating through the downstream zone to said other cylindrical surface, said extensions having ends of substantially uniform cross-sectional area.

8. An improved coalescer cartridge of the type formed of glass fibers in the shape of a cylinder with an axial hole therethrough for separating a water emulsion from a hydrocarbon fuel flowing into the inner cylindrical surface of the cartridge and discharging from the outer cylindrical surface, wherein the improvement comprises:
an outer cylindrical zone, including the outer cylindrical surface, wherein the glass fibers are resinated;
an intermediate cylindrical zone wherein the glass fibers are unresinated, said intermediate zone having a plurality of spaced radial extensions penetrating through the outer zone to form a pattern of substantially equal discrete areas of unresinated glass fibers on the outer cylindrical surface; and
an inner cylindrical zone, including the inner cylindrical surface, wherein the glass fibers are resinated.

References Cited

UNITED STATES PATENTS

| | | |
|---|---|---|
| 2,395,301 | 2/1946 | Sloan. |
| 2,918,173 | 12/1959 | Daley et al. _____ 210—492 |
| 3,034,656 | 5/1962 | Kasten _____ 210—492 |
| 3,142,612 | 7/1964 | Reiman. |
| 3,228,527 | 1/1966 | McPherson. |

JOHN W. ADEE, Primary Examiner

U.S. Cl. X.R.

210—504